(12) United States Patent
Pillai et al.

(10) Patent No.: US 7,720,132 B2
(45) Date of Patent: *May 18, 2010

(54) ENERGY—BANDWIDTH TRADEOFF AND TRANSMIT WAVEFORM DESIGN USING INTERFERENCE AND NOISE WHITENING METHOD

(75) Inventors: Unnikrishna Sreedharan Pillai, Harrington Park, NJ (US); Ke Yong Li, Jackson Heights, NY (US)

(73) Assignee: C&P Technologies, Inc., Closter, NJ (US)

( * ) Notice: Subject to any disclaimer, the term of this patent is extended or adjusted under 35 U.S.C. 154(b) by 644 days.

This patent is subject to a terminal disclaimer.

(21) Appl. No.: 11/681,218

(22) Filed: Mar. 2, 2007

(65) Prior Publication Data

US 2008/0170492 A1 Jul. 17, 2008

Related U.S. Application Data

(63) Continuation-in-part of application No. 11/623,965, filed on Jan. 17, 2007.

(51) Int. Cl.
*H04B 1/00* (2006.01)
*H04L 27/00* (2006.01)
*G01N 30/86* (2006.01)
*H03K 5/01* (2006.01)

(52) U.S. Cl. ............... 375/145; 375/259; 327/1; 327/100; 178/66.1

(58) Field of Classification Search ............... 178/66.1; 327/1, 100; 375/259
See application file for complete search history.

(56) References Cited

U.S. PATENT DOCUMENTS 7,109,714 B2 * 9/2006 Rudakov et al. ............ 324/322

| | | | |
|---|---|---|---|
| 2005/0046609 A1 * | 3/2005 | Wasiewicz | 342/159 |
| 2005/0116714 A1 * | 6/2005 | Rudakov et al. | 324/322 |
| 2006/0238406 A1 * | 10/2006 | Nohara et al. | 342/90 |
| 2007/0008214 A1 * | 1/2007 | Wasiewicz | 342/159 |
| 2007/0040556 A1 * | 2/2007 | Rudakov et al. | 324/322 |
| 2008/0166976 A1 * | 7/2008 | Rao | 455/69 |

OTHER PUBLICATIONS

"Optimum Signals in Noise and Reverberation", Author Theo Kooij, Saclant ASW Research Centre, Le Spezia, Italy, presented at "Nato Advanced Study Institute on Signal Processing with Emphasis on Underwater Acoustics", Enschede, the Netherlands, Aug. 23, 1968; and.

"Energy Threshold Constraints in Transmit Waveform Design", Author(s) S. Unnikrishna Pillai, Ke Yong Li (applicants for current application), Braham Himed, presented at "Waveform Diversity and Design Conference" Kauai, Hawaii, Jan. 22-27, 2006.

* cited by examiner

*Primary Examiner*—David C Payne
*Assistant Examiner*—Erin M File
(74) *Attorney, Agent, or Firm*—Walter J. Tencza, Jr.

(57) ABSTRACT

A new method for transmitter-receiver design that enhances the desired signal output from the receiver by whitening the total interference and noise input to the receiver and maximizing the output Signal to Interference plus Noise power Ratio (SINR) is presented. As a result of the whitening process, the receiver "sees" a desired signal in white noise, and the receiver structure is then optimized to maximize the receiver output at the desired decision making instant. Furthermore the new design scheme proposed here can be used for transmit signal energy and bandwidth tradeoff. As a result, transmit signal energy can be used to tradeoff for "premium" signal bandwidth without sacrificing the system performance level in terms of the output Signal to Interference plus Noise power Ratio (SINR).

34 Claims, 6 Drawing Sheets

Fig. 4A   Fig. 4B   Fig. 4C
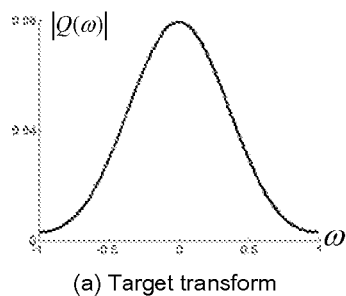
(a) Target transform
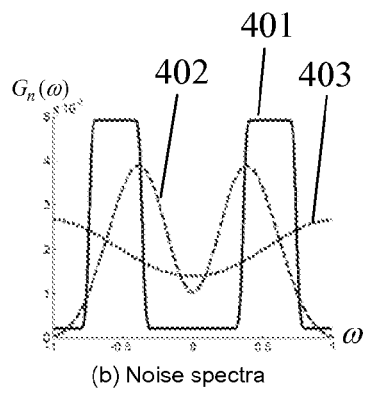
(b) Noise spectra
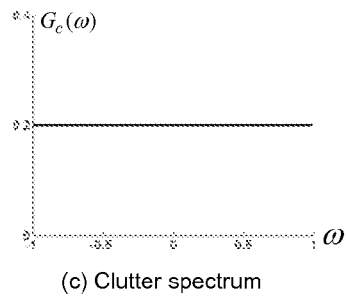
(c) Clutter spectrum
Fig. 4D   Fig. 4E
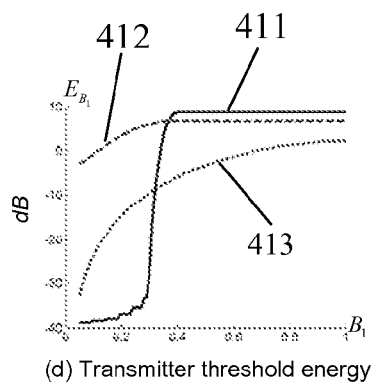
(d) Transmitter threshold energy
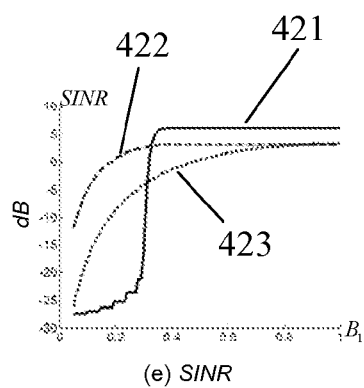
(e) SINR (a) Target transforms (b) Noise spectrum (c) Clutter spectrum (d) Transmitter threshold energy (e) SINR (a) Resonant Target (b) Low-pass Target (c) Flat Target Fig. 8A
Fig. 8B
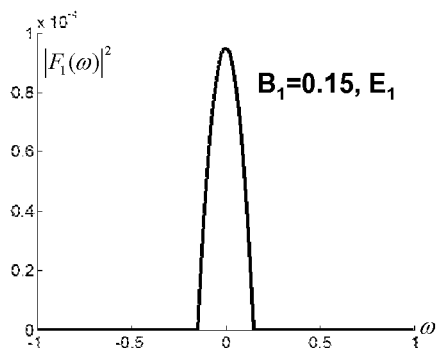
(a) Design for point A in Fig. 7A and Fig. 7B
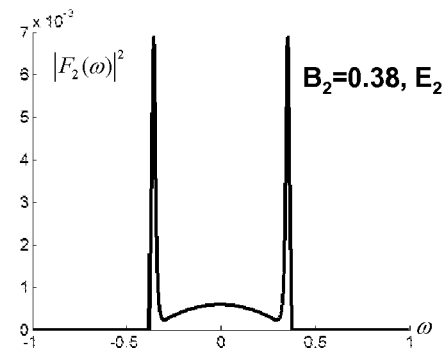
(b) Design for point B in Fig. 7A and Fig. 7B
Fig. 8C
Fig. 8D
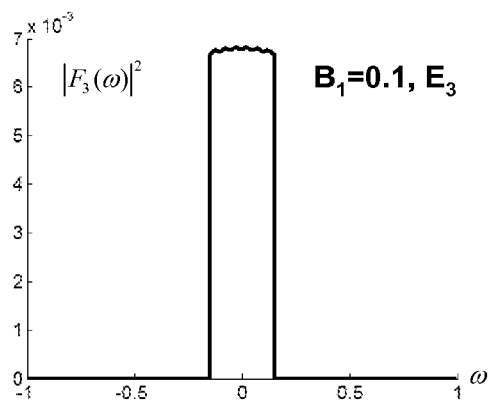
(c) Design for point C in Fig. 7A
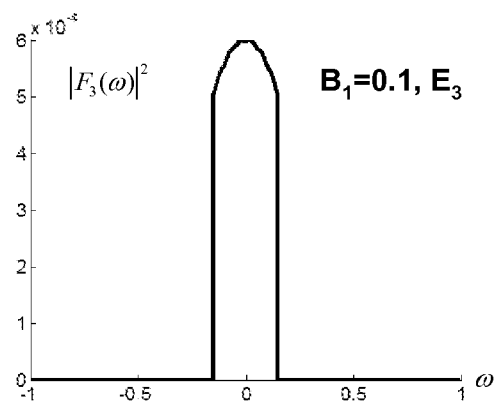
(d) Design for point C in Fig. 7B

ENERGY—BANDWIDTH TRADEOFF AND TRANSMIT WAVEFORM DESIGN USING INTERFERENCE AND NOISE WHITENING METHOD

CROSS REFERENCE TO RELATED APPLICATION(S)

The present application is a continuation in part of and claims the priority of U.S. patent application Ser. No. 11/623,965, titled "APPARATUS AND METHOD FOR PROVIDING ENERGY—BANDWIDTH TRADEOFF AND WAVEFORM DESIGN IN INTERFERENCE AND NOISE", filed on Jan. 17, 2007, inventor UNNIKRISHNA SREEDHARAN PILLAI.

STATEMENT REGARDING FEDERALLY SPONSORED RESEARCH OR DEVELOPMENT

The present invention is based upon work supported and/or sponsored by the Air Force Research Laboratory (AFRL), Rome, N.Y. under contract No. FA8750-06-C-0202

FIELD OF INVENTION

The invention relates to techniques related to a tradeoff between energy and bandwidth of a transmit signal.

BACKGROUND OF INVENTION

Consider a desired target that is buried in both interference and noise. A transmit signal excites both the desired target and the interference simultaneously. The interference and/or interferences can be foliage returns in the form of clutter for radar, scattered returns of the transmit signal from the sea-bottom and different ocean-layers in the case of sonar, or multipath returns in a communication scene. The interference returns can also include jamming signals. In all these cases, like the target return, the interference returns are also transmit signal dependent, and hence it puts conflicting demands on the receiver. In general, the receiver input is comprised of target returns, interferences and the ever present noise. The goal of the receiver is to enhance the target returns and simultaneously suppress both the interference and noise signals. In a detection environment, a decision regarding the presence or absence of a target is made at some specified instant $t=t_o$ using output data from a receiver, and hence to maximize detection, the Signal power to average Interference plus Noise Ratio (SINR) at the receiver output can be used as an optimization goal. This scheme is illustrated in FIG. 1.

The transmitter output bandwidth can be controlled using a known transmitter output filter having a transfer function $P_1(\omega)$ (see FIG. 2B). A similar filter with transform characteristics $P_2(\omega)$ can be used at a receiver input $22a$ shown in FIG. 1, to control the receiver processing bandwidth as well.

The transmit waveform set f(t) at an output $10a$ of FIG. 1, can have spatial and temporal components to it, each designated for a specific goal. A simple situation is that shown in FIG. 2A where a finite duration waveform f(t) of energy E is to be designed. Thus the total energy can be expressed in the time domain or frequency domain as $$\int_0^{T_o} |f(t)|^2 dt = \frac{1}{2\pi} \int_{-\infty}^{+\infty} |F(\omega)|^2 d\omega = E. \tag{1}$$

Here $$F(\omega) = \int_{-\infty}^{+\infty} f(t) e^{-j\omega t} dt \tag{2}$$

refers to the Fourier transform of the transmit waveform f(t).

Usually, transmitter output filter 12 characteristics $P_1(\omega)$, such as shown in FIG. 2B, are known and for design purposes, it can be incorporated into the target transform and clutter spectral characteristics. Similarly, the receiver input filter if any (which may be at the input to the receiver 22) can be incorporated into the target transform as well as the clutter and noise spectra. Here onwards we will assume such to be the case.

Let $q(t) \Leftrightarrow Q(\omega)$ represent the target impulse response and its transform. In general q(t) can be any arbitrary waveform. Thus the modified target that accounts for the transmitter output filter has transform $P_1(\omega)Q(\omega)$. Here onwards, we shall refer to this modified form as the "target transform", and the associated inverse transform as the "target" response signal and represent them simply by $Q(\omega)$ and q(t) respectively. In a linear domain setup, the transmit signal f(t) interacts with the target q(t), or target 14 shown in FIG. 1, to generate the output below (referred to in S. U. Pillai, H. S. Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000 and S. M. Kay, J. H. Thanos, "Optimal Transmit Signal Design for Active Sonar/Radar", Proceedings of IEEE International Conference on Acoustics, Speech, and Signal Processing, 2002 (ICASSP 02), Vol. 2, pp. 1513-1516, 2002):

$$s(t) = f(t) * q(t) = \int_0^{T_o} f(\tau) q(t-\tau) d\tau \tag{3}$$

that represents the desired signal.

The interference returns are usually due to the random scattered returns of the transmit signal from the environment, and hence can be modeled as a stochastic signal $w_c(t)$ that is excited by the transmit signal f(t). If the environment returns are stationary, then the interference can be represented by the interference power spectrum $G_c(\omega)$. Once again, if a transmit output filter is present then $|P_1(\omega)|^2 G_c(\omega)$ represents the modified interference spectrum. Here onwards, the interference power spectrum so modified will be referred simply by $G_c(\omega)$. This gives the average interference power at the receiver input to be $G_c(\omega)|F(\omega)|^2$. Finally let n(t) represent the receiver 22 input noise with power spectral density $G_n(\omega)$. Thus the receiver input signal at input 22a equals $$r(t)=s(t)+w_c(t)*f(t)+n(t), \tag{4}$$

and the receiver input interference plus noise power spectrum equals $$G_I(\omega)=G_c(\omega)|F(\omega)|^2+G_n(\omega). \tag{5}$$

The received signal is presented to the receiver 22 at input 22a with impulse response h(t). The general receiver is of the noncausal type.

With no restrictions on the receiver 22 of FIG. 1 such as causal or noncausal, its output signal component and interference/noise components at output 22b in FIG. 1 are given by $$y_s(t) = s(t) * h(t) = \frac{1}{2\pi} \int_{-\infty}^{+\infty} S(\omega)H(\omega)e^{j\omega t} d\omega \quad (6)$$

and $$y_n(t) = \{w_c(t) * f(t) + n(t)\} * h(t). \quad (7)$$

The output $y_n(t)$ represents a second order stationary stochastic process with power spectrum below (referred to in the previous publications and in Athanasios Papoulis, S. Unnikrishna Pillai, Probability, Random Variables and Stochastic Processes, McGraw-Hill Higher Education, New York 2002):

$$G_o(\omega) = (G_c(\omega)|F(\omega)|^2 + G_n(\omega))|H(\omega)|^2 \quad (8)$$

and hence the total output interference plus noise power is given by $$\sigma_{I+N}^2 = \frac{1}{2\pi} \int_{-\infty}^{+\infty} G_o(\omega) d\omega \quad (9)$$

$$= \frac{1}{2\pi} \int_{-\infty}^{+\infty} (G_c(\omega)|F(\omega)|^2 + G_n(\omega))|H(\omega)|^2 d\omega.$$

Referring back to FIG. 1, the signal component $y_s(t)$ in equation (6) at the receiver output 22b needs to be maximized at the decision instant $t_o$ in presence of the above interference and noise. Hence the instantaneous output signal power at $t=t_o$ is given by the formula below shown in S. U. Pillai, H. S. Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000, which is incorporated by reference herein:

$$P_o = |y_s(t_o)|^2 = \left| \frac{1}{2\pi} \int_{-\infty}^{+\infty} S(\omega)H(\omega)e^{j\omega t_o} d\omega \right|^2. \quad (10)$$

This gives the receiver output SINR at $t=t_o$ to be the following as specified in Pillai et. al., "Optimum Transmit-Receiver Design in the Presence of Signal-Dependent Interference and Channel Noise", incorporated herein by reference:

$$SINR = \frac{P_o}{\sigma_{I+N}^2} = \frac{\left| \frac{1}{2\pi} \int_{-\infty}^{+\infty} S(\omega)H(\omega)e^{j\omega t_o} d\omega \right|^2}{\frac{1}{2\pi} \int_{-\infty}^{+\infty} G_I(\omega)|H(\omega)|^2 d\omega}. \quad (11)$$

We can apply Cauchy-Schwarz inequality in equation (11) to eliminate $H(\omega)$. This gives $$SINR \leq \frac{1}{2\pi} \int_{-\infty}^{+\infty} \frac{|S(\omega)|^2}{G_I(\omega)} d\omega = \quad (12)$$

$$\frac{1}{2\pi} \int_{-\infty}^{+\infty} \frac{|Q(\omega)|^2 |F(\omega)|^2}{G_c(\omega)|F(\omega)|^2 + G_n(\omega)} d\omega = SINR_{\max}.$$

Thus the maximum obtainable SINR is given by the right side of equation (12), and this SINR is realized by the receiver design if and only if the following receiver transform referred to in previous prior art publications, is true:

$$H_{opt}(\omega) = \frac{S^*(\omega)}{G_c(\omega)|F(\omega)|^2 + G_n(\omega)} e^{-j\omega t_o} \quad (13)$$

$$= \frac{Q^*(\omega)F^*(\omega)}{G_c(\omega)|F(\omega)|^2 + G_n(\omega)} e^{-j\omega t_o}.$$

In equation (13), the phase shift $e^{-j\omega t_o}$ can be retained to approximate causality for the receiver waveform. Interestingly even with a point target ($Q(\omega) \equiv 1$), flat noise ($G_n(\omega) = \sigma_n^2$), and flat clutter ($G_c(\omega) = \sigma_c^2$), the optimum receiver is not conjugate-matched to the transmit signal transform $F(\omega)$ as in the classical matched filter receiver.

Prior Art Transmitter Waveform Design

When the receiver design satisfies equation (13), the output SINR is given by the right side of the equation (12), where the free parameter $|F(\omega)|^2$ can be chosen to further maximize the output SINR, subject to the transmit energy constraint in equation (1). Thus the transmit signal design reduces to the following optimization problem: Maximize $$SINR_{\max} = \frac{1}{2\pi} \int_{-\infty}^{+\infty} \frac{|Q(\omega)|^2 |F(\omega)|^2}{G_c(\omega)|F(\omega)|^2 + G_n(\omega)} d\omega, \quad (14)$$

subject to the energy constraint $$\int_0^{T_o} |f(t)|^2 dt = \frac{1}{2\pi} \int_{-\infty}^{+\infty} |F(\omega)|^2 d\omega = E. \quad (15)$$

To solve this new constrained optimization problem, combine equations (14)-(15) to define the modified Lagrange optimization function (referred to in T. Kooij, "Optimum Signal in Noise and Reverberation", *Proceeding of the NATO Advanced Study Institute on Signal Processing with Emphasis on Underwater Acoustics*, Vol. I, Enschede, The Netherlands, 1968.)

$$\Lambda = \int_{-\infty}^{+\infty} \left\{ \frac{|Q(\omega)|^2 y^2(\omega)}{G_c(\omega)y^2(\omega) + G_n(\omega)} - \frac{1}{\lambda^2} y^2(\omega) \right\} d\omega \quad (16)$$

where $$y(\omega) = |F(\omega)| \quad (17)$$

is the free design parameter. From equations (16)-(17), $$\frac{\partial \Lambda}{\partial y} = 0$$

gives (details omitted)

$$\frac{\partial \Lambda(\omega)}{\partial y} = 2y(\omega) \left\{ \frac{G_n(\omega)|Q(\omega)|^2}{\{G_c(\omega)y^2(\omega) + G_n(\omega)\}^2} - \frac{1}{\lambda^2} \right\} = 0. \quad (18)$$

where $\Lambda(\omega)$ represents the quantity within the integral in equation (16). From equation (18), either $$y(\omega) = 0 \qquad (19)$$

or $$\frac{G_n(\omega)|Q(\omega)|^2}{\{G_c(\omega)y^2(\omega) + G_n(\omega)\}^2} - \frac{1}{\lambda^2} = 0, \qquad (20)$$

which gives $$y^2(\omega) = |F(\omega)|^2 = \frac{\sqrt{G_n(\omega)}\left(\lambda|Q(\omega)| - \sqrt{G_n(\omega)}\right)}{G_c(\omega)} \qquad (21)$$

provided $y^2(\omega) > 0$. See T. Kooij cited above incorporated by reference herein.

However, this particular method is not relevant to the current invention, since as disclosed in the next section, the current invention focuses on compressing and stretching out the total interference plus noise spectrum to be white (flat) over the desired frequency band of interest by redesigning the transmit signal transform accordingly.

SUMMARY OF THE INVENTION

One or more embodiments of the present invention provide a method and an apparatus for transmitter-receiver design that enhances the desired signal output from the receiver at the decision making instant while the total interference and noise output are whitened over the desired frequency band of interest. Furthermore a method and apparatus of an embodiment of the present invention can be used for transmit signal energy-bandwidth tradeoff. As a result, transmit signal energy can be used to tradeoff for "premium" signal bandwidth without sacrificing performance level in terms of the output Signal to Interference plus Noise power Ratio (SINR). The two different designs—before the tradeoff and after the tradeoff (both are embodiments of the present invention)—will result in two different transmitter-receiver pairs that have the same performance level. Thus an embodiment of the present invention that uses a certain energy and bandwidth can be traded off with a new embodiment of the present invention that uses lesser bandwidth compared to the old design, also part of the present invention. Depending on the target details, interestingly the energy required for the new design, embodiment of the present invention, can be more or some times less compared to the old design, also part of present invention. In many applications such as in telecommunications, since the available bandwidth is at premium, such a tradeoff will result in releasing otherwise unavailable bandwidth at the expense of additional signal energy. The bandwidth so released can be used for other applications or to add additional telecommunications capacity.

BRIEF DESCRIPTION OF THE DRAWINGS

FIG. 4A shows a graph of target transfer function magnitude response versus frequency;

FIG. 4B shows graphs of three different noise power spectra marked 401, 402 and 403 versus frequency;

FIG. 4C shows a graph of clutter power spectrum versus frequency;

FIG. 4D shows graphs of three different transmitter threshold energy marked 411, 412 and 413 versus bandwidth for the three cases shown in FIG. 4B;

FIG. 4E shows graphs of three different signal to inference plus noise ratio (SINR) marked 421, 422 and 324 versus bandwidth for the three cases shown in FIG. 4B;

FIG. 8A shows a graph of the magnitude response of the transform of the transmitter signal versus frequency corresponding to the design point A in FIG. 7A (or FIG. 7B);

FIG. 8B shows a graph of the magnitude response of the transform of the transmitter signal versus frequency corresponding to the design point B in FIG. 7A (or FIG. 7B);

FIG. 8C shows a graph of the magnitude response of the transform of the transmitter signal versus frequency corresponding to the design point C in FIG. 7A; and FIG. 8D shows a graph of the magnitude response of the transform of the transmitter signal versus frequency corresponding to the design point C in FIG. 7B.

DETAILED DESCRIPTION OF THE DRAWINGS

Figure 1:
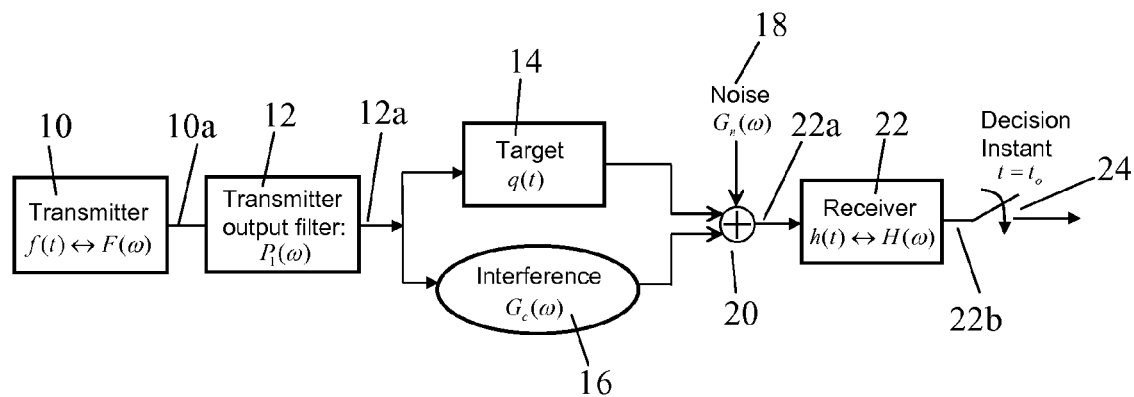
FIG. 1 shows a diagram of a system, apparatus, and/or method including a transmitter, a transmitter output filter, a receiver, a target, interference, noise, and a switch.

FIG. 1 shows a diagram of a system, apparatus, and/or method 1, including a transmitter 10, a transmitter output filter 12, a target 14, interference 16, noise 18, a summation block 20, receiver 22, and a switch 24. The present invention, in one or more embodiments, provides a new method and an apparatus, by selecting a particular transmit signal, to be output from the transmitter 10, and a type of receiver or receiver transfer function for receiver 22 in accordance with criteria to be discussed below.

The transmitter 10 transmits an output signal f(t) at its output 10a and supplies this signal to the transmitter output filter 12. As remarked earlier, for design purposes, the transmitter output filter 12 can be lumped together with the target transfer function as well as with the interference spectrum. The transmit signal f(t) passes through the airwaves and interacts with a target 14 and interference 16. The target-modified as well as the clutter-modified (or interference modified) versions of the transmit signal f(t) are supplied to the summation block 20 along with receiver noise 18. The summation block 20 may simply be used for description purposes to indicate that the target modified, clutter modified, and noise signals combine together. A combination signal is supplied to receiver 22 at its input 22a. The receiver 22 applies a transfer function H(ω) (which will be determined and/or selected by criteria of an embodiment of the present invention such as in equation (13), or as described below)-and a modified combination signal is provided at a receiver output 22b. The output is accessed at time $t=t_o$ by use of a switch 24.

Figure 2A:
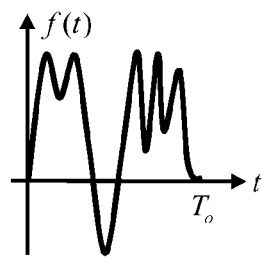
FIG. 2A shows a prior art graph of a prior art transmitter signal versus time, wherein the transmitter signal is output from a transmitter, such as in FIG. 1.

FIG. 2A shows a prior art graph of a prior art transmitter output signal f(t) versus time. The signal used here is arbitrary for illustration purpose only.

Figure 2B:
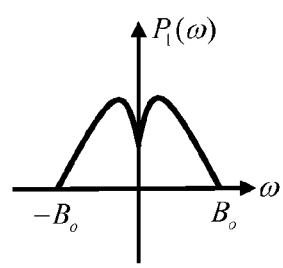
FIG. 2B shows a prior art graph of a possible frequency spectrum of a known transmitter output filter, such as in FIG. 1.

FIG. 2B shows a prior art graph of a frequency spectrum of the transmitter output filter 12 of FIG. 1.

Figure 3A:
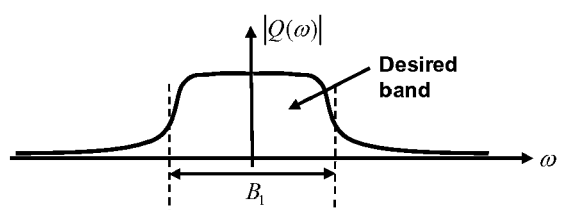
FIG. 3A shows a graph of target transfer function magnitude response versus frequency.

FIG. 3A shows a typical graph of a target transfer function magnitude response for target 14 versus frequency; target as appearing in equations (3)-(14).

Figure 3B:
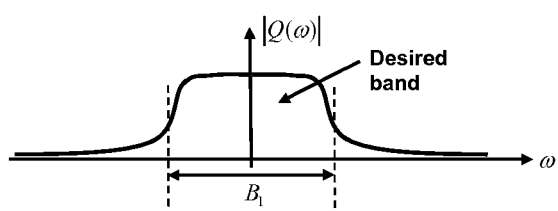
FIG. 3B shows a graph of target transfer function magnitude response versus frequency.

FIG. 3B shows a typical graph of target transfer function magnitude response for target 14 versus frequency; target as appearing in equations (3)-(14).

Figure 3C:
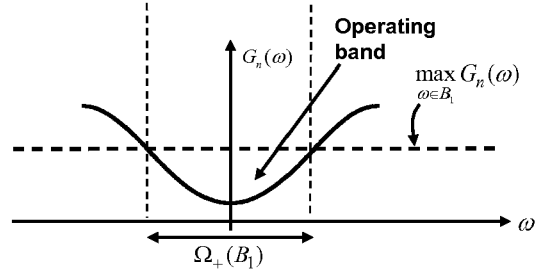
FIG. 3C shows a graph of noise power spectrum versus frequency.

FIG. 3C shows a graph of noise power spectrum versus frequency; as in right side of equation (27).

Figure 3D:
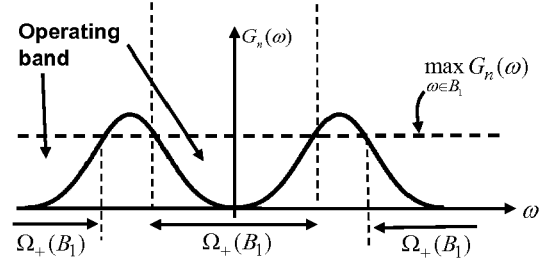
FIG. 3D shows a graph of noise power spectrum versus frequency.

FIG. 3D shows a graph of noise power spectrum versus frequency; as in right side of equation (27).

FIG. 4A shows a graph of target transfer function magnitude response versus frequency, target as appearing in equations (14)-(21).

FIG. 4B shows a graph of three different noise power spectra labeled 401, 402 and 403 versus frequency as appearing in equations (14)-(27).

FIG. 4C shows a graph of clutter power spectrum versus frequency as appearing in equations (14)-(27).

FIG. 4D shows graphs of transmitter threshold energy labeled 411, 412 and 413 versus bandwidth using equation (34) or (36) for the three cases in FIG. 4B.

FIG. 4E shows a graph of signal to inference plus noise ratio labeled 421, 422 and 423 versus bandwidth using equation (43) for the three cases in FIG. 4B.

Figure 5A:
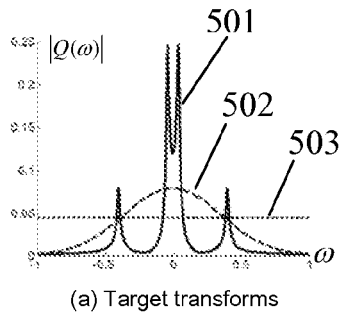
FIG. 5A shows graphs of three different target transfer function magnitude responses marked 501, 502 and 503 versus frequency.

FIG. 5A shows graphs of three different target transfer function magnitude responses labeled 501, 502 and 503 versus frequency, target as appearing in equations (14)-(21).

Figure 5B:
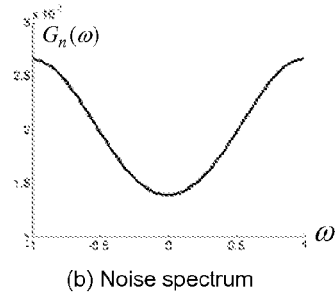
FIG. 5B shows graphs of noise power spectrum versus frequency.

FIG. 5B shows a graph of noise power spectrum versus frequency as appearing in equations (14)-(27)).

Figure 5C:
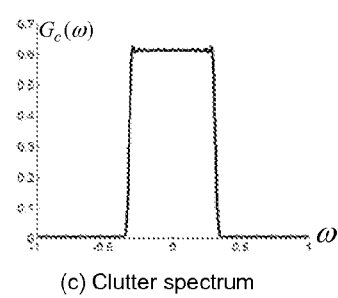
FIG. 5C shows a graph of clutter power spectrum versus frequency.

FIG. 5C shows a graph of clutter power spectrum versus frequency as appearing in equations (14)-(27).

Figure 5D:
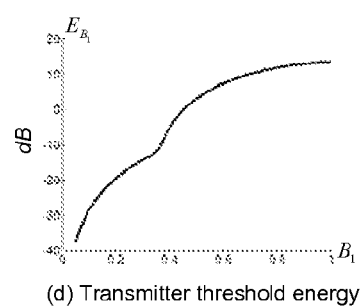
FIG. 5D shows graph of transmitter threshold energy versus bandwidth for the case shown in FIGS. 5B-5C.

FIG. 5D shows a graph of transmitter threshold energy versus bandwidth using equation (34) or (36) for the situation shown in FIGS. 5B-5C.

Figure 5E:
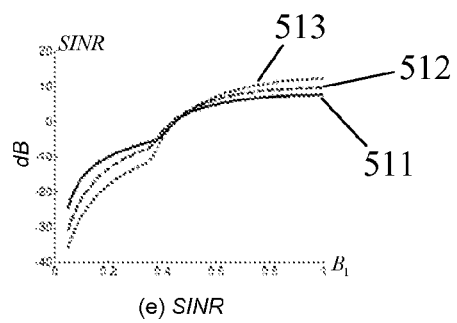
FIG. 5E shows graphs of three different signal to inference plus noise ratio (SINR) marked 511, 512 and 513 versus bandwidth for the three cases shown in FIG. 5A.

FIG. 5E shows graphs of signal to inference plus noise ratio labeled 511, 512 and 513 versus bandwidth using equation (43) for the three cases 501, 502 and 503 in FIG. 5A.

Figure 6A:
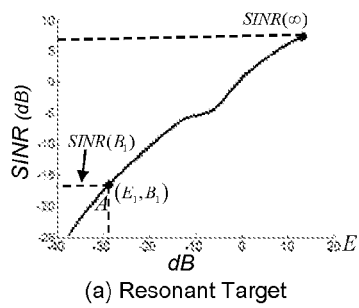
FIG. 6A shows a graph of signal to interference plus noise ratio (SINR) versus energy for a resonant target 501 (solid line) shown in FIG. 5A.

FIG. 6A shows a graph of signal to interference plus noise ratio versus energy for a resonant target 501 shown in FIG. 5A (solid line) using equations (36) and (43).

Figure 6B:
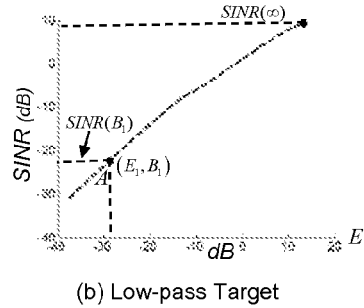
FIG. 6B shows a graph of signal to interference plus noise ratio (SINR) versus energy for a low pass target 502 (dashed line) shown in FIG. 5A.

FIG. 6B shows a graph of signal to interference plus noise ratio versus energy for a low pass target 502 shown in FIG. 5A (dashed line) using equations (36) and (43).

Figure 6C:
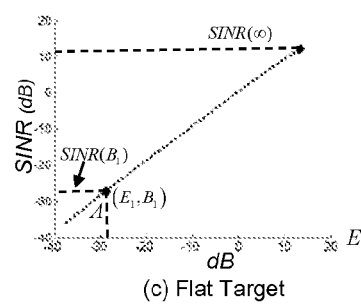
FIG. 6C shows a graph of signal to interference plus noise ratio (SINR) versus energy for a flat target 503 (dotted line) shown in FIG. 5A.

FIG. 6C shows a graph of signal to interference plus noise ratio versus energy for a flat target 503 shown in FIG. 5A (dotted line) using equations (36) and (43).

Figure 7A:
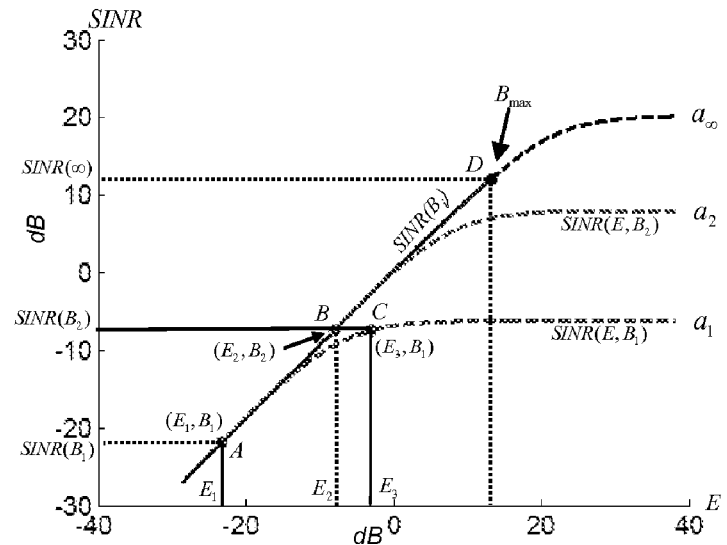
FIG. 7A shows a graph of signal to interference plus noise ratio versus energy and the Bandwidth-Energy tradeoff design for the flat target 503 (dotted line) shown in FIG. 5A.

FIG. 7A shows a graph of signal to interference plus noise ratio versus energy; generated using equations (39)-, (43) and (49) for the flat target 503 (dotted line) shown in FIG. 5A.

Figure 7B:
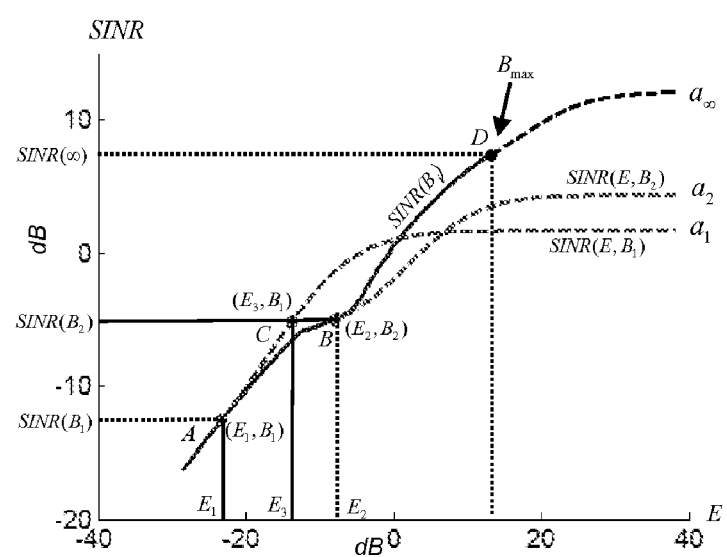
FIG. 7B shows a graph of signal to interference plus noise ratio versus energy and the Bandwidth-Energy tradeoff design for the resonant target 501 (solid line) shown in FIG. 5A.

FIG. 7B shows a graph of signal to interference plus noise ratio versus energy; generated using equations (39)-(43) and (49) for the resonant target 501 (solid line) shown in FIG. 5A.

FIG. 8A shows a graph of the magnitude of the transform of a transmitter signal versus frequency corresponding to the design point A in FIG. 7A (or FIG. 7B) generated using equation (44).

FIG. 8B shows a graph of a magnitude of a transform of a transmitter signal versus frequency corresponding to the design point B in FIG. 7A (or FIG. 7B) generated using equation (44).

FIG. 8C shows a graph of a magnitude of a transform of a transmitter signal versus frequency corresponding to the design point C in FIG. 7A generated using an equation (37) for a third energy condition.

FIG. 8D shows a graph of a magnitude of a transform of a transmitter signal versus frequency corresponding to the design point C in FIG. 7B generated using equation (37) for a third energy condition.

Define $\Omega_+$ to represent the frequencies over which $|F(\omega)|^2$ in equation (21) is strictly positive, and let $\Omega_o$ represent the complement of $\Omega_+$. In general the set $\Omega_+$ is a function of the noise and target spectral characteristics as well as the bandwidth constraints.

The optimization problem in equations (14)-(15) can be restated in terms of $\Omega_+$ as follows: Given $Q(\omega)$, $G_c(\omega)$, $G_n(\omega)$ and the transmit energy E, how to partition the frequency axis into an "operating band" $\Omega_+$ and a "no show" band $\Omega_o$ so that $SINR_{max}$ in equation (14) is maximized. In general maximization of $SINR_{max}$ over $\Omega_+$ is a highly nonlinear optimization problem for arbitrary $Q(\omega)$, $G_c(\omega)$ and $G_n(\omega)$ and it has been dealt with successfully in U.S. patent application Ser. No. 11/623,965, which is incorporated herein by reference.

In what follows a new approach to this problem is presented where instead of focusing on global SINR maximization, the total interference spectrum in equation (5) is first whitened, and then in a subsequent step the resulting SINR is maximized by using the appropriate matched filter receiver.

An Embodiment of the Present Invention—Whitening Approach

Suppose the total interference spectrum $G_i(\omega)$ in equation (5) can be made equal to a suitable constant $\sigma_o^2$ over the desired frequency band through the transmit waveform design, then the problem reduces to the classical situation of a signal in white (flat) noise, in which case an ordinary matched filter receiver is optimum (see A. Papoulis, S. U. Pillai, *Probability, Random Variables and Stochastic Processes*, referred to earlier). To analyze, whether it is indeed possible to realize this goal, let $$G_i(\omega) = G_c(\omega)|F(\omega)|^2 + G_n(\omega) = \sigma_o^2 \tag{22}$$

then from equation (22)

$$|F(\omega)|^2 = \frac{\sigma_o^2 - G_n(\omega)}{G_c(\omega)}, \tag{23}$$

and it represents the desired transmit waveform transform. From equations (22)-(23), the new role of the transmit signal is mainly to compress and reshape $G_c(\omega)$ together with $G_n(\omega)$ so that the interference plus noise spectra characteristic at 22a becomes flat in frequency. In that case, the receiver 22 observes an incoming signal s(t) as in equation (3) that is buried in "white noise". As a result, using equation (22) in equation (11) we get $$SINR = \frac{1}{2\pi} \frac{\left|\int_{-\infty}^{+\infty} S(\omega)H(\omega)e^{j\omega_0 t}d\omega\right|^2}{\sigma_o^2 \int_{-\infty}^{+\infty} |H(\omega)|^2 d\omega}. \quad (24)$$

We can use once again the Cauchy-Schwarz inequality in equation (24) to eliminate $H(\omega)$. This gives $$SINR \leq \frac{1}{2\pi\sigma_o^2} \int_{-\infty}^{+\infty} |S(\omega)|^2 d\omega = SINR_{max}. \quad (25)$$

From equation (25), equality is achieved there if the receiver transform, for receiver 22, satisfies $$H_{opt}(\omega) = S^*(\omega)e^{-j\omega_0 t} = Q^*(\omega)F^*(\omega)e^{-j\omega_0 t}, \quad (26)$$

and it represents the standard matched filter optimum receiver structure in this case. Observe that $|F(\omega)|^2$ in equation (23) must be nonnegative and this puts restrictions on the constant $\sigma_o^2$ there.

In particular, from equation (23) the constant $\sigma_o^2$ must satisfy $$\sigma_o^2 \geq G_n(\omega) \quad (27)$$

over the operating frequency band $\Omega_+$ to satisfy $|F(\omega)|^2 \geq 0$. As shown in FIG. 3C, FIG. 3D, one approach in this situation is to make use of the "desired frequency band" of interest $B_1$ that is usually suggested by the target response $Q(\omega)$ (and the transmitter output filter 12) to determine the operating band $\Omega_+(B_1)$. The desired band $B_1$ can represent a fraction of the total available bandwidth, or the whole bandwidth itself. The procedure for determining $\Omega_+(B_1)$ is illustrated in FIGS. 3A-3C and FIGS. 3B-3D for two different noise situations. In FIGS. 3A-3D, the frequency band $B_1$ represents the desired band, and because of the nature of the noise and clutter spectra, it may be necessary to operate on a larger region $\Omega_+(B_1)$ in the frequency domain. Thus the desired band $B_1$ is contained always within the operating band $\Omega_+(B_1)$. To determine $\Omega_+$, using equation (27) we project the band $B_1$ onto the spectrum $G_n(\omega)$ and draw a horizontal line corresponding to $$\sigma_{B_1}^2 = \max_{\omega \in B_1} G_n(\omega) \quad (28)$$

as shown there. Define $\Omega_+(B_1)$ to represent the frequency region where $$\omega \in \Omega_+(B_1) : G_n(\omega) \leq \sigma_{B_1}^2 = \max_{\omega \in B_1} G_n(\omega). \quad (29)$$

Thus, the noise spectra over the desired frequency band $\Omega_+(B_1)$ is also bounded by the constant in equation (28). This procedure can give rise to two situations as shown in FIG. 3C and FIG. 3D. In FIGS. 3A, 3C, the operating band $\Omega(B_1)$ coincides with the desired band $B_1$ as shown in FIG. 3C, whereas in FIGS. 3B, 3D, the desired band $B_1$ is a subset of $\Omega_+(B_1)$ as seen from FIG. 3D.

In terms of $\Omega_+(B_1)$, we get the desired transmitter waveform transform to be $$|F(\omega)|^2 = \begin{cases} \dfrac{\sigma_{B_1}^2 - G_n(\omega)}{G_c(\omega)}, & \omega \in \Omega_+(B_1), \\ 0, & \text{otherwise} \end{cases} \quad (30)$$

where $\sigma_{B_1}^2$ is given in equation (28). The energy constraint in equation (1) when applied to equation (30) gives $$E = \frac{1}{2\pi} \int_{\Omega_+(B_1)} |F(\omega)|^2 d\omega = \quad (31)$$

$$\frac{\sigma_{B_1}^2}{2\pi} \int_{\Omega_+(B_1)} \frac{1}{G_c(\omega)} d\omega - \frac{1}{2\pi} \int_{\Omega_+(B_1)} \frac{G_n(\omega)}{G_c(\omega)} d\omega.$$

From equation (31), for a given energy E and bandwidth $B_1$, we also obtain $$\sigma_o^2(E) = \frac{E + \dfrac{1}{2\pi} \int_{\Omega_+(B_1)} \dfrac{G_n(\omega)}{G_c(\omega)} d\omega}{\dfrac{1}{2\pi} \int_{\Omega_+(B_1)} \dfrac{1}{G_c(\omega)} d\omega}. \quad (32)$$

Since $\sigma_o^2(E)$ in equation (32) must exceed the constant in equation (28), this gives rise to the energy constraint $$E \geq E_{min} \quad (33)$$

where from equations (28) and (31)

$$E_{min} = \quad (34)$$

$$\left(\max_{\omega \in B_1} G_n(\omega)\right) \frac{1}{2\pi} \int_{\Omega_+(B_1)} \frac{1}{G_c(\omega)} d\omega - \frac{1}{2\pi} \int_{\Omega_+(B_1)} \frac{G_n(\omega)}{G_c(\omega)} d\omega = E_1$$

represents the minimum threshold energy that must be available at the transmitter 10 to operate at bandwidth $B_1$, and this energy requirement is characteristic to this design approach. Interestingly, substituting equation (34) into equation (32) and comparing with equation (28) we also obtain $$\sigma_o^2(E_1) = \sigma_{B_1}^2 = \max_{\omega \in B_1} G_n(\omega). \quad (35)$$

In other words, the minimum value for the constant $\sigma_o^2$ with minimum energy $E_1$ is the same as that corresponding to bandwidth $B_1$. For a given transmitter energy E, knowing $\Omega_+(B_1)$, one can compute $\sigma_o^2$ with the help of equation (32) over that region, and examine whether $\sigma_o^2$ so obtained satisfies the equation (29). If not, the transmitter energy E is insufficient to maintain the operating band $\Omega_+(B_1)$ given in equation (29), and either E must be increased, or $\Omega_+(B_1)$ must be decreased (by decreasing $B_1$) so that equation (28) is satisfied. Thus for a given desired band $B_1$ (or an operating band $\Omega_+(B_1)$), there exists a minimum transmitter threshold energy $E_1$, below which it is impossible to maintain $|F(\omega)|^2>0$ over that entire operating band.

Threshold Energy

Proceeding as in equation (34), in general, we obtain the minimum transmitter threshold energy for desired bandwidth $B_i$ to be the following $$E_i = \frac{1}{2\pi}(\max_{\omega \in B_i} G_n(\omega)) \int_{\Omega_+(B_i)} \frac{1}{G_c(\omega)} d\omega - \frac{1}{2\pi} \int_{\Omega_+(B_i)} \frac{G_n(\omega)}{G_c(\omega)} d\omega > 0. \quad (36)$$

With $E \geq E_1$, we have $\sigma_o^2(E)$ in equation (32) satisfies equation (27) and the $SINR_{max}$ in equation (25) can be readily computed. From equation (23), the transmit waveform transform in this case is given by (see also equation (30) that represents the transmit waveform associated with the minimum threshold energy)

$$|F(\omega)|^2 = \begin{cases} \dfrac{\sigma_o^2(E) - G_n(\omega)}{G_c(\omega)}, & \omega \in \Omega_+(B_1) \\ 0, & \text{otherwise} \end{cases} \quad (37)$$

and using this in equation (25)

$$\begin{aligned} SINR_{\max} &= \frac{1}{2\pi \sigma_o^2(E)} \int_{\Omega_+(B_1)} |S(\omega)|^2 d\omega \\ &= \frac{1}{2\pi \sigma_o^2(E)} \int_{\Omega_+(B_1)} |Q(\omega)|^2 |F(\omega)|^2 d\omega \\ &= \frac{1}{2\pi} \int_{\Omega_+(B_1)} \left(1 - \frac{G_n(\omega)}{\sigma_o^2(E)}\right) \frac{|Q(\omega)|^2}{G_c(\omega)} d\omega \\ &= \frac{1}{2\pi} \int_{\Omega_+(B_1)} \frac{|Q(\omega)|^2}{G_c(\omega)} d\omega - \\ &\quad \frac{1}{2\pi \sigma_o^2(E)} \int_{\Omega_+(B_1)} \frac{|Q(\omega)|^2 G_n(\omega)}{G_c(\omega)} d\omega \\ &= \frac{1}{2\pi} \int_{\Omega_+(B_1)} \frac{|Q(\omega)|^2}{G_c(\omega)} d\omega - \\ &\quad \frac{\frac{1}{2\pi} \int_{\Omega_+(B_1)} \frac{|Q(\omega)|^2 G_n(\omega)}{G_c(\omega)} d\omega \cdot \frac{1}{2\pi} \int_{\Omega_+(B_1)} \frac{1}{G_c(\omega)} d\omega}{E + \frac{1}{2\pi} \int_{\Omega_+(B_1)} \frac{G_n(\omega)}{G_c(\omega)} d\omega} \\ &= a_1 - \frac{c_1}{E + b_1} \end{aligned} \quad (38)$$

where the constants $a_1$, $b_1$ and $c_1$ are given by substituting $i=1$ in $$a_i = \frac{1}{2\pi} \int_{\Omega_+(B_i)} \frac{|Q(\omega)|^2}{G_c(\omega)} d\omega, \quad (39)$$

$$b_i = \frac{1}{2\pi} \int_{\Omega_+(B_i)} \frac{G_n(\omega)}{G_c(\omega)} d\omega, \quad (40)$$

and $$c_i = \frac{1}{2\pi} \int_{\Omega_+(B_i)} \frac{|Q(\omega)|^2 G_n(\omega)}{G_c(\omega)} d\omega \cdot \frac{1}{2\pi} \int_{\Omega_+(B_i)} \frac{1}{G_c(\omega)} d\omega. \quad (41)$$

From equations (38)-(41) in general for bandwidth $B_i$ and energy $E>E_i$.

$$SINR(E, B_i) = SINR_{\max} = a_i - \frac{c_i}{E + b_i} \quad (42)$$

represents the maximum realizable SINR using this approach for a given bandwidth $B_i$ and transmitter energy $E$ that exceeds $E_{min}=E_i$ in equation (36). In particular, the maximum SINR realizable, using minimum energy is given by equation (42) with $E$ replaced by $E_{min}=E_i$ in (36). This gives $$SINR(B_i) = a_i - \frac{c_i}{E_i + b_i}. \quad (43)$$

Equation (43) represents the performance level for bandwidth $B_i$ using its minimum threshold energy $E_i$, and equation (42) represents the performance level for the same bandwidth using energy $E$ that exceeds the minimum threshold energy. From equation (30), we also obtain the transmit signal transform corresponding to energy $E_i$ to be $$|F(\omega)|^2 = \begin{cases} \dfrac{(\max_{\omega \in B_i} G_n(\omega)) - G_n(\omega)}{G_c(\omega)}, & \omega \in \Omega_+(B_i) \\ 0, & \omega \in \Omega_o \end{cases} \quad (44)$$

where $\Omega_o$ represents the complement of the frequency region $\Omega_+(B_i)$.

To summarize, to maintain a given desired band $B_i$, there exists an operating band $\Omega_+(B_i) \geq B_i$ over which the transmit waveform transform $|F(\omega)|^2>0$ and to guarantee this, the transmit energy must be at least equal to a minimum threshold value $E_i$ given by equation (36).

FIGS. 4A-E shows the transmitter threshold energy E in equation (36) and the corresponding SINR in equation (43) as a function of the desired bandwidth $B_1$ for a low pass target, flat clutter, and various noise spectra marked as 401, 402 and 403, respectively, shown in FIG. 4B. Target or Signal to noise ratio (SNR) is set at 0 dB, and the clutter to noise power ratio (CNR) is set at 20 dB in all cases shown here. The total noise power is normalized to unity. The desired bandwidth $B_1$ is normalized with respect to the maximum available bandwidth (e.g., carrier frequency).

In FIGS. 4A-E, the target is low pass, and the clutter has a flat spectrum and for the brick-wall type high pass noise spectrum 401 (solid line) shown in FIG. 4B, the required minimum energy threshold and the SINR generated using equations (36) and (43) reach a saturation value for small values of the bandwidth as shown by 411 and 421 (solid lines) in FIGS. 4D-4E, respectively. In the case of the other two noise spectra given by 402 and 403 shown in FIG. 4B, additional bandwidth is required to reach the maximum attainable SINR as seen from 412, 413 in FIG. 4D and 422, 423 in FIG. 4E. This is not surprising since for the high pass noise spectrum 401 (solid line), a significant portion of the target energy is concentrated around the noise free central (low pass) region. Hence once the transmit signal bandwidth covers the noise free region, it latches onto the target features resulting in maximum SINR at a lower bandwidth.

FIGS. 5A-E show results for three different targets whose target transforms are labeled 501, 502 and 503, in FIG. 5A, and a new set of clutter and noise spectra. The transmitter threshold energy E in equation (36) plotted in FIG. 5D, and the corresponding SINR in equation (43), as a function of the desired bandwidth $B_1$, given by 511, 512 and 513 in FIG. 5E show similar performance details. Since the transmit design is independent of the target characteristics, the minimum threshold energy is the same for all these target situations (FIG. 5D).

As FIG. 3D shows, $\Omega_+(B_1)$ can be comprised of multiple disjoint frequency bands whose complement $\Omega_o$ represents the "no show" region. Notice that the "no show" region $\Omega_o$ in the frequency domain in equation (44) for the transmit signal can be controlled by increasing the desired bandwidth $B_1$. By increasing $B_1$, these "no show" regions can be made narrower and this defines a minimum transmitter threshold energy $E_\infty$ that allows $\Omega_+(B_1)$ to be the entire available frequency axis. To determine $E_\infty$, let $\sigma_o^2(\infty)$ represent the maximum in equation (28) over the entire frequency axis. Thus $$\sigma_o^2(\infty) = \max_{|\omega|<\infty} G_n(\omega), \quad (45)$$

and let $a_\infty$, $b_\infty$, $c_\infty$ refer to the constants a, b, c in equations (39)-(41) calculated with $\Omega_+(B_1)$ representing the entire frequency axis. Then from equation (36)

$$E_\infty = \left(\max_{|\omega|<\infty} G_n(\omega)\right) \frac{1}{2\pi} \int_{-\infty}^{+\infty} \frac{1}{G_c(\omega)} d\omega - \frac{1}{2\pi} \int_{-\infty}^{+\infty} \frac{G_n(\omega)}{G_c(\omega)} d\omega > 0 \quad (46)$$

represents the minimum transmit energy (threshold) required to avoid any partitioning in the frequency domain. With $E_\infty$ as given by equation (46), we obtain $SINR_{max}$ to be (use equation (43))

$$SINR_1(\infty) = a_\infty - \frac{c_\infty}{E_\infty + b_\infty} > 0 \quad (47)$$

and from equation (44)

$$|F(\omega)|^2 = \frac{\left(\max_{|\omega|<\infty} G_n(\omega)\right) - G_n(\omega)}{G_c(\omega)}, \quad |\omega|<\infty. \quad (48)$$

Clearly by further increasing the transmit energy in equation (47) beyond that in equation (46) we obtain $$SINR_1 \to a_\infty = \frac{1}{2\pi} \int_{-\infty}^{-\infty} \frac{|Q(\omega)|^2}{G_c(\omega)} d\omega. \quad (49)$$

It follows that to avoid any restrictions in the frequency domain for the transmit signal, the transmitter energy E must be at least equal to a minimum threshold value $E_\infty$ given by equations (46) and (47), which represents the maximum realizable SINR in that case. By increasing E beyond $E_\infty$, the performance can be improved up to that in equation (49).

In general from equation (36) for a given desired bandwidth $B_i$, the transmit energy E must exceed its threshold value $E_i$. With $E>E_i$ and $\sigma_o^2(E)$ as in equation (32), the corresponding transmit signal transform is given by (see equation (37)) and clearly this signal is different from a minimum threshold energy transmit signal given by equation (44). From equation (38), the performance level $SINR(E, B_1)$ corresponding to equation (37) with transmit energy exceeding the threshold energy is given by equation (42) (with $B_i=B_1$), and the performance level that corresponds to equation (44) with transmit energy equal to the threshold energy is given by equation (43) (with $B_i=B_1$). Thus with $E>E_i$, we have $$SINR(E, B_1) = a_1 - \frac{c_1}{E+b_1} > SINR(B_1). \quad (50)$$

From equation (50), for a given bandwidth $B_1$, performance can be increased beyond that in equation (43) by increasing the transmit energy beyond its threshold value in equation (34) and the performance is upper bounded by $a_1$. Hence it follows that $SINR(B_1)$ represents the minimum performance level for bandwidth $B_1$ that is obtained by using the minimum threshold energy given in equation (34) for bandwidth $B_1$. It is quite possible that this improved performance $SINR(E,B_1)$ for bandwidth $B_1$ can be equal to the minimum performance level corresponding to a higher bandwidth $B_2>B_1$. This gives rise to the concept of Energy-Bandwidth tradeoff at a certain performance level. Undoubtedly this is quite useful when bandwidth is at premium.

FIGS. 5D-5E exhibit the transmit threshold energy in equation (36) and the corresponding output $SINR(B_1)$ in equation (43) as a function of the desired bandwidth $B_1$. Combining these figures using equations (36) and (43), a SINR vs. transmit threshold energy plot can be generated as in FIGS. 6A-C for each of the target situations shown in FIG. 5A.

For example, FIGS. 6A-C correspond to the three different target situations 501, 502 and 503 respectively considered in FIGS. 5A-E with clutter and noise spectra as shown there. Notice that each point on the SINR-Energy threshold curve for each target is associated with a specific desired bandwidth. Thus for bandwidth $B_1$, the minimum threshold energy required is $E_1$ in equation (36), and the corresponding SINR equals $SINR_1(B_1)$ in equation (43). Let A represent the associated operating point in FIGS. 6A-C. Note that the operating point A corresponding to a bandwidth $B_1$ has different threshold energies and different performance levels for different targets 501, 502 and 503 given in FIG. 5A. From equation (48), each operating point generates a distinct transmit waveform. As the bandwidth increases, from equation (47), $SINR \to SINR_1(\infty)$.

Monotonic Property of SINR

The threshold energy and SINR associated with a higher bandwidth can be shown to be higher. To prove this, consider two desired bandwidths $B_1$ and $B_2$ with $B_2>B_1$. Then from equation (35) we have $$\sigma_o^2(E_2) = \max_{\omega \in B_2} G_n(\omega) \geq \sigma_o^2(E_1) = \max_{\omega \in B_1} G_n(\omega), \quad (51)$$

and from FIGS. 3A-D, the corresponding operating bandwidths $\Omega_+(B_1)$ and $\Omega_+(B_2)$ satisfy $$\Omega_-(B_2) \supseteq \Omega_+(B_1) \quad (52)$$

From equation (36), the minimum threshold energies are given by $$E_i = \frac{1}{2\pi} \int_{\Omega_+(B_i)} (\sigma_o^2(E_i) - G_n(\omega)) \frac{1}{G_c(\omega)} d\omega, \ i = 1, 2 \quad (53)$$

and substituting equations (51) and (52) into equation (53) we get $$E_2 > E_1 \quad (54)$$

Also from equation (38), the performance levels at threshold energy $SINR(B_i)$ equals $$SINR(B_i) = \frac{1}{2\pi} \int_{\Omega_+(B_i)} \left(1 - \frac{G_n(\omega)}{\sigma_o^2(E_i)}\right) \frac{|Q(\omega)|^2}{G_c(\omega)} d\omega \quad (55)$$

and an argument similar to equations (51)-(52) gives $$SINR(B_2) \geq SINR(B_1) \quad (56)$$

for $B_2 > B_1$. Thus as FIGS. 5A-E—FIGS. 6A-C show, SINR $(B_i)$ is a monotonically non decreasing function of both bandwidth and energy. FIG. 7A illustrates this SINR-energy relation for the target 503 with flat spectrum (dotted line) shown in FIG. 5A and FIG. 7B illustrates this SINR-energy relation for the resonant target 501 (solid line with sharp spikes) shown in FIG. 5A. In FIG. 7A and FIG. 7B, the solid curve represents $SINR(B_1)$ in equation (43) and the two operating points A and B are associated with bandwidths $B_1$ and $B_2$, threshold energies $E_1$ and $E_2$, and performance levels SINR $(B_1)$ and $SINR(B_2)$ respectively. Since $$B_2 > B_1 \Rightarrow E_2 \geq E_1 \text{ and } SINR(B_2) \geq SINR(B_1). \quad (57)$$

The distinct transmit waveforms $|F_1(\omega)|^2$ and $|F_2(\omega)|^2$ associated with the operating points A and B for FIG. 7A are given by equation (44) with i=1,2 there, and they are shown in FIGS. 8A and 8B respectively. Notice that the waveform for the operating point A in FIG. 7B coincides with that of operating point A in FIG. 7A, and similarly for the operating point B in FIG. 7B coincides with that of operating point B in FIG. 7A, since from equation (44), these waveforms depend only on the noise and clutter spectra which are the same in FIGS. 5B-5C.

Consider the operating point A associated with the desired bandwidth $B_1$. If the transmit energy E is increased beyond the corresponding threshold value $E_1$ with bandwidth held constant at $B_1$, the performance $SINR_1(E, B_1)$ increases beyond that at A since from equation (50)

$$SINR(E, B_1) = a_1 - \frac{c_1}{E + b_1} \geq a_1 - \frac{c_1}{E_1 + b_1} = SINR(B_1) \quad (58)$$

and it is upper bounded by $a_1$. Here $a_1$ corresponds to the $SINR_1(E, B_1)$ performance in equation (58) for bandwidth $B_1$ as the transmit energy $E \to \infty$ (similar to equation (49)). Note that $a_1$, $b_1$ and $c_1$ are the constants in equations (39)-(41) with $\Omega_+(B_i)$ replaced by $\Omega_+(B_1)$. The dashed curves $Aa_1$ in FIGS. 7A and 7B represent $SINR_1(E, B_1)$ for various values of E. From equation (37), each point on the curve $Aa_1$ generates a new transmit waveform as well.

Depending on the target characteristics, the dashed curves $SINR_1(E, B_1)$ may or may not cross over the performance (solid) curve $SINR(B_i)$. This is illustrated in FIG. 7A and FIG. 7B for these two different situations. In FIG. 7A, the dashed curve does not cross over the solid curve $SINR(B_i)$, whereas in FIG. 7B, the dashed curve crosses over the solid curve $SINR(B_i)$.

In FIGS. 7A-7B, assume that the saturation performance value $a_1$ for bandwidth $B_1$ satisfies $$a_1 \geq SINR(B_2), \quad (59)$$

i.e., the maximum performance level for bandwidth $B_1$ (obtained with $E \to \infty$) is greater than or equal to the performance level associated with the operating point B with a higher bandwidth $B_2$ and a higher threshold energy $E_2$. In FIGS. 7A and 7B, a horizontal line is drawn through B to intersect the curve $Aa_1$ at C, and a perpendicular is dropped at C to intersect the x-axis at $E_3$. From equation (58) with $E=E_3$ by construction we get, $$SINR(E_3, B_1) = SINR(B_2). \quad (60)$$

Thus the operating point C on the curve $Aa_1$ is associated with energy $E_3$, lower bandwidth $B_1$ and corresponds to a performance level of $SINR_1(B_2)$ associated with a higher bandwidth. Notice that in FIG. 7A we have $$E_3 > E_2 > E_1, \text{ and } B_1 < B_2 \quad (61)$$

and in FIG. 7B $$E_2 > E_3 > E_1, \text{ and } B_1 < B_2. \quad (62)$$

In other words, by increasing the transmit energy from $E_1$ to $E_3$ while holding the bandwidth constant at $B_1$, the performance equivalent to a higher bandwidth $B_2$ can be realized in both situations provided $B_2$ satisfies equation (59). As a result, energy-bandwidth tradeoff is possible within reasonable limits. Observe that $E_3$ is always higher than $E_1$, however it may be higher or lower than $E_2$, the minimum threshold energy corresponding to bandwidth $B_2$ depending on the situation at hand. The transmit waveform $|F_3(\omega)|^2$ associated with the operating point C is obtained using equation (37) by replacing E with $E_3$ and it is illustrated in FIG. 8C for the situation in FIG. 7A and in FIG. 8D for the situation in FIG. 7B. In a similar manner, the waveforms corresponding to the operating points A and B in FIG. 7A can be obtained using equation (44) by replacing the energy-bandwidth pair $(E_i, B_i)$ there with $(E_1, B_1)$ and $(E_2, B_2)$ respectively. These waveforms are shown in FIG. 8A and FIG. 8B respectively. Notice that since the clutter and noise spectra are the same in both FIG. 7A and FIG. 7B, the waveform corresponding to points A and B in FIG. 7B also are given by those in FIG. 8A and FIG. 8B. A comparison with FIGS. 8A and 8B show that the waveforms at C in FIG. 8C and FIG. 8D are different from those associated with operating points A and B. Since $E_3$ is different in FIG. 7A and FIG. 7B, the waveforms in FIG. 8C and FIG. 8D are also different.

It is important to note that although the transmit waveform design $|F_3(\omega)|^2$ and $|F_1(\omega)|^2$ correspond to the same bandwidth (with different energies $E_3$ and $E_1$), one is not a scaled version of the other. Changing transmit energy from $E_1$ to $E_3$ ends up in a new waveform $|F_3(\omega)|^2$ that maintains a performance level associated with a larger bandwidth $B_2$. Finally, to obtain the transmit waveforms in time domain an appropriate phase function can be used to the magnitude transforms so obtained, prior to their inverse Fourier transform operation. These phase functions can be used to make the transmit waveforms causal in which case a minimum phase transmit waveform can be generated. The phase functions can also be selected so as to retain chirp signal like properties for the transmit signal.

The question of how much bandwidth tradeoff can be achieved at an operating point is an interesting one. From the above argument, an equality condition in equation (59) gives the upper bound on how much effective bandwidth increment can be achieved by increasing the transmit energy. Notice that for an operating point A, the desired bandwidth $B_1$ gives the operating bandwidth $\Omega_+(B_1)$ and from the equation (42) with i=1 the performance limit (as $E \to \infty$)

$$a_1 = \frac{1}{2\pi} \int_{\Omega_+(B_1)} \frac{|Q(\omega)|^2}{G_c(\omega)} d\omega \tag{63}$$

for bandwidth $B_1$ can be computed. Assume $B_2 > B_1$, and from equation (43) using $B_i = B_2$, $SINR_1(B_2)$ the minimum performance at $B_2$ also can be computed, and for maximum bandwidth swapping the nonlinear equation $$a_1 = SINR_1(B_2) \tag{64}$$

must be solved for $B_2$. Then $$\Delta B(B_1) = B_2 - B_1 \tag{65}$$

represents the maximum bandwidth enhancement that can be realized at $B_1$.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method comprising
providing a transmitter and a receiver;
selecting a desired bandwidth $B_1$ for a transmit signal f(t);
outputting the transmit signal f(t) from the transmitter towards a target and towards interference,
wherein the target produces a target signal;
and further comprising receiving a combination signal at an input of the receiver, wherein the combination signal includes noise and the transmit signal f(t) modified by interacting with the target and the interference,
wherein the receiver acts on the combination signal to form a receiver output signal,
wherein the transmit signal f(t) is selected so that the total interference at the input of the receiver is whitened, and the receiver is configured so that the ratio of the receiver output signal to interference plus noise power is maximized while maintaining the desired bandwidth $B_1$ for the receiver output signal, and
wherein the Fourier transform $F(\omega)$ of the transmit signal f(t) is given by:

$$|F(\omega)|^2 = \begin{cases} \dfrac{(\max_{\omega \in B_1} G_n(\omega))}{G_c(\omega)}, & \omega \in \Omega_+(B_1) \\ 0, & \omega \in \Omega_o \end{cases}$$

wherein
$B_1$ is the desired bandwidth of the transmit signal f(t);
$G_c(\omega)$ is the interference spectrum;
$G_n(\omega)$ is the noise spectrum;
$\Omega_0$ is complementary region in the frequency to $\Omega_+(B_1)$ and
$\Omega_+(B_1)$ represents the frequency region where the following inequality is satisfied: for $\omega \in \Omega_+(B_1)$ we have $$G_n(\omega) \leq \max_{\omega \in B_1} G_n(\omega).$$

2. The method of claim 1 further comprising
selecting a receiver filter for the receiver such that the receiver filter has a Fourier transform $H_{opt}(\omega)$ which is given by $$H_{opt}(\omega) = Q^*(\omega) F^*(\omega) e^{-j\omega t_o}$$

wherein $Q(\omega)$ is the target signal Fourier transform and wherein $t_o$ is a decision instant at which the target signal is to be detected.

3. A method comprising
providing a transmitter and a receiver;
selecting a desired bandwidth $B_1$ for a transmit signal f(t);
selecting a desired energy E that exceeds a predetermined energy level $E_{min}$ given below;
outputting the transmit signal f(t) from the transmitter towards a target and towards interference,
wherein the target produces a target signal;
and further comprising receiving a combination signal at an input of the receiver, wherein the combination signal includes noise and the transmit signal f(t) modified by interacting with the target and the interference,
wherein the receiver acts on the combination signal to form a receiver output signal,
wherein the transmit signal f(t) is selected so that the total interference at the input of the receiver is whitened, and the receiver is configured so that the ratio of the receiver output signal to interference plus noise power is maximized while maintaining the desired bandwidth $B_1$ for the receiver output signal, and
wherein $$E_{min} = \left(\max_{\omega \in \Omega_+(B_1)} G_n(\omega)\right) \frac{1}{2\pi} \int_{\Omega_+(B_1)} \frac{1}{G_c(\omega)} d\omega - \frac{1}{2\pi} \int_{\Omega_+(B_1)} \frac{G_n(\omega)}{G_c(\omega)} d\omega,$$

and wherein the Fourier transform $F(\omega)$ of the transmit signal f(t) is given by
wherein $$|F(\omega)|^2 = \begin{cases} \dfrac{\sigma_o^2(E_3) - G_n(\omega)}{G_c(\omega)}, & \omega \in \Omega_+(B_1) \\ 0, & \omega \in \Omega_o \end{cases}$$

wherein $$\sigma_o^2(E_3) = \frac{E_3 + \dfrac{1}{2\pi} \int_{\Omega_+(B_1)} \dfrac{G_n(\omega)}{G_c(\omega)} d\omega}{\dfrac{1}{2\pi} \int_{\Omega_+(B_1)} \dfrac{1}{G_c(\omega)} d\omega},$$

and wherein
B$_1$ is the desired bandwidth of the transmit signal f(t);
E is the prescribed energy of the transmit signal f(t);
G$_c$(ω) is the interference spectrum;
G$_n$(ω) is the noise spectrum;
Ω$_0$ is complementary region in the frequency to Ω$_+$(B$_1$) and
Ω$_+$(B$_1$) represents the frequency region where the following inequality is satisfied: for ω∈Ω$_+$(B$_1$) we have $$G_n(\omega) \leq \max_{\omega \in B_1} G_n(\omega).$$

4. The method of claim 3 wherein
the interference and the noise are part of a space based radar scene.

5. The method of claim 3 wherein
the interference and the noise are part of an airborne based radar scene.

6. The method of claim 3 wherein
the interference and the noise are part of a ground based radar scene.

7. The method of claim 3 wherein
the interference and the noise are part of an underwater sonar scene.

8. The method of claim 3 wherein
the transmit signal f(t), the target, the interference, and the noise are part of a cellular communication scene wherein the transmit signal f(t) represents a desired modulated signal, the target represents a channel, and the interference represents all interference signals.

9. A method comprising
providing a transmitter and a receiver;
selecting a first transmit signal f(t) which will cause a total interference at an input of the receiver to be whitened;
outputting the first transmit signal f(t) from the transmitter towards a target,
wherein the target produces a first target signal when the first transmit signal interacts with the target,
wherein the first transmit signal f(t) has a first transmit signal bandwidth, a first transmit signal energy, and a first transmit signal waveform;
and further comprising receiving a first combination signal at the input of the receiver, wherein the first combination signal includes a first noise signal, a first interference signal, and a first return signal which is the first transmit signal f(t) returned back from the target disregarding any effects of noise or interference,
acting on the first combination signal using the receiver to form a first receiver output signal,
wherein the first receiver output signal has a first receiver output signal waveform; and further comprising
wherein the first transmit signal has a first performance level which is a ratio of the first receiver output signal to the first interference signal plus the first noise signal;
outputting a second transmit signal from the transmitter towards the target,
wherein the second transmit signal has a second transmit signal bandwidth, a second transmit signal energy, and a second transmit signal waveform,
and further comprising receiving a second combination signal at the receiver, wherein the second combination signal includes a second noise signal, a second interference signal, and a second return signal which is the second transmit signal returned back from the target disregarding any effects of noise or interference;
acting on the second combination signal using the receiver to form a second receiver output signal,
wherein the second receiver output signal has a second receiver output signal waveform,
wherein the second transmit signal bandwidth and the first transmit signal bandwidth are different,
wherein the second transmit signal energy and the first transmit signal energy are different,
wherein if the second transmit signal bandwidth is higher than the first transmit signal bandwidth, then the second transmit signal energy will be lower than the first transmit signal energy,
wherein if the second transmit signal bandwidth is lower than the first transmit signal bandwidth, then the second transmit signal energy will be higher than the first transmit signal energy,
wherein the second transmit signal has a second performance level which is a ratio of the second receiver output signal to the second interference signal plus the second noise signal,
and wherein the first performance level is substantially the same as second performance level.

10. The method of claim 9 further comprising
selecting an initial desired first bandwidth B$_1$ for the first transmit signal bandwidth and determining the minimum required energy E$_1$ for the first transmit signal energy according to $$E_1 = \frac{1}{2\pi} \int_{\Omega_+(B_1)} \frac{\sigma_o^2(E_1) - G_n(\omega)}{G_c(\omega)} d\omega$$

wherein $$\sigma_o^2(E_1) = \max_{\omega \in B_1} G_n(\omega),$$

and determining the first performance level for an energy-bandwidth pair (E$_1$, B$_1$) by the following equation:

$$SINR(B_1) = \frac{1}{2\pi} \int_{\Omega_+(B_1)} \left(1 - \frac{G_n(\omega)}{\sigma_o^2(E_1)}\right) \frac{|Q(\omega)|^2}{G_c(\omega)} d\omega,$$

wherein
Q(ω) is a Fourier transform of the first target signal;
G$_c$(ω) is a spectrum of the first interference signal;
G$_n$(ω) is a spectrum of the first noise signal; and
Ω$_+$(B$_1$) represents a frequency region where the following inequality is satisfied: for ω∈Ω$_+$(B$_1$) we have $$G_n(\omega) = \leq \max_{\omega \in B_1} G_n(\omega).$$

11. The method of claim 10 further comprising
selecting B$_2$ for the second transmit signal bandwidth larger than the first transmit signal bandwidth B$_1$ so as to satisfy the condition $$SINR(B_2) \leq \frac{1}{2\pi} \int_{\Omega_+(B_1)} \frac{|Q(\omega)|^2}{G_c(\omega)} d\omega,$$

and for which the corresponding second transmit signal energy $E_2$ and the second performance level $SINR_1(B_2)$ are determined as follows $$E_2 = \frac{1}{2\pi} \int_{\Omega_+(B_2)} \frac{\sigma_o^2(E_2) - G_n(\omega)}{G_c(\omega)} d\omega$$

and $$SINR(B_2) = \frac{1}{2\pi} \int_{\Omega_+(B_1)} \left(1 - \frac{G_n(\omega)}{\sigma_o^2(E_2)}\right) \frac{|Q(\omega)|^2}{G_c(\omega)} d\omega,$$

where $$\sigma_o^2(E_2) = \max_{\omega \in B_2} G_n(\omega),$$

and $\Omega_+(B_2)$ represent a frequency region where the following inequality is satisfied:

$$\omega \in \Omega_+(B_2): G_n(\omega) \leq \max_{\omega \in B_2} G_n(\omega);$$

and further comprising determining a new energy level $E_3$ that satisfies the identity $$SINR(E_3, B_1) = a_1 - \frac{c_1}{E_3 + b_1} = SINR(B_2),$$

where $$a_1 = \frac{1}{2\pi} \int_{\Omega_+(B_1)} \frac{|Q(\omega)|^2}{G_c(\omega)} d\omega,$$

$$b_1 = \frac{1}{2\pi} \int_{\Omega_+(B_1)} \frac{G_n(\omega)}{G_c(\omega)} d\omega,$$

and $$c_1 = \frac{1}{2\pi} \int_{\Omega_+(B_1)} \frac{G_n(\omega)|Q(\omega)|^2}{G_c(\omega)} d\omega \cdot \frac{1}{2\pi} \int_{\Omega_+(B_1)} \frac{1}{G_c(\omega)} d\omega$$

outputting a third transmit signal from the transmitter towards the target, wherein the third transmit signal has a third transmit signal bandwidth, a third transmit signal energy which is the new energy level $E_3$, and a third transmit signal waveform, and further comprising receiving a third combination signal at the receiver, wherein the third combination signal includes a third noise signal, a third interference signal, and a third return signal which is the third transmit signal returned back from the target disregarding any effects of noise or interference;

acting on the third combination signal using the receiver to form a third receiver output signal, wherein the third receiver output signal has a third receiver output signal waveform, wherein the third transmit signal bandwidth and the second transmit signal bandwidth are different, wherein the third transmit signal energy and the second transmit signal energy are different, wherein if the third transmit signal bandwidth is higher than the second transmit signal bandwidth, then the third transmit signal energy will be lower than the second transmit signal energy, wherein if the third transmit signal bandwidth is lower than the second transmit signal bandwidth, then the third transmit signal energy will be higher than the second transmit signal energy, wherein the third transmit signal has a third performance level which is a ratio of the third receiver output signal to the third interference signal plus the third noise signal, and wherein the third performance level is substantially the same as second performance level.

12. The method of claim 11 further comprising constructing the first transmit signal having the first transmit signal waveform;

constructing the second transmit signal having the second transmit signal waveform;

wherein the first transmit signal is different from the second transmit signal and the first transmit signal waveform is different from the second transmit signal waveform;

wherein the first transmit signal has a prescribed bandwidth which is $B_1$, wherein the first transmit signal has an minimum energy which is $E_1$, wherein the third transmit signal has a bandwidth which is $B_2$, wherein the third transmit signal has a prescribed energy level which is $E_3$;

wherein the first transmit signal has a Fourier transform given by $$|F(\omega)|^2 = \begin{cases} \left\{\left(\max_{\omega \in B_2} G_n(\omega)\right) - G_n(\omega)\right\} \frac{1}{G_c(\omega)}, & \omega \in \Omega_+(B_2) \\ 0, & \text{otherwise} \end{cases};$$

wherein the third transmit signal has a Fourier transform given by $$|F(\omega)|^2 = \begin{cases} \frac{\sigma_o^2(E_3) - G_n(\omega)}{G_c(\omega)}, & \omega \in \Omega_+(B_1) \\ 0, & \omega \in \Omega_o \end{cases}$$

wherein $$\sigma_o^2(E_3) = \frac{E_3 + \frac{1}{2\pi} \int_{\Omega_+(B_1)} \frac{G_n(\omega)}{G_c(\omega)} d\omega}{\frac{1}{2\pi} \int_{\Omega_+(B_1)} \frac{1}{G_c(\omega)} d\omega},$$

and wherein the first and third transmit signals have the same performance level $SINR(B_2)$ in terms of target detection in interference and noise, when used in conjunction with the receiver, wherein the receiver has a receiver filter which performs a Fourier transform on the first combination signal to form the first receiver output signal and performs a Fourier transform on the third combination signal to form the third receiver output signal, wherein the Fourier transform performed by the receiver filter, $H_{opt}(\omega)$ given by $$H_{opt}(\omega) = Q^*(\omega) F^*(\omega) e^{-j\omega t_o}$$

wherein $t_o$ is a decision instant at which the first target signal is to be detected.

13. The method of claim 9 wherein
the first transmit signal f(t), the target, the first interference signal, and the first noise signal are part of a cellular communication scene wherein the first transmit signal f(t) represents a desired modulated signal, the target represents a channel, and the first interference signal represents all interference signals in the first combination signal.

14. The method of claim 9 wherein
the first interference signal and the first noise signal are part of a space based radar scene.

15. The method of claim 9 wherein
the first interference signal and the first noise signal are part of an airborne based radar scene.

16. The method of claim 9 wherein
the first interference signal and the first noise signal are part of a ground based radar scene.

17. The method of claim 9 wherein
the first interference signal and the first noise signal are part of an underwater sonar scene.

18. An apparatus comprising
a transmitter; and
a receive,
wherein the transmitter is configured to transmit a transmit signal f(t) of a bandwidth $B_1$ towards a target and towards interference,
wherein the target produces a target signal,
wherein the receiver is configured to receive a combination signal at an input of the receiver, wherein the combination signal includes noise and the transmit signal f(t) modified by interacting with the target and the interference,
wherein the receiver is configured to act on the combination signal to form a receiver output signal,
wherein the transmit signal f(t) is selected so that the total interference at the input of the receiver is whitened, and the receiver is configured so that the ratio of the receiver output signal to interference plus noise power is maximized while maintaining the bandwidth $B_1$ for the receiver output signal, and
wherein the Fourier transform $F(\omega)$ of the transmit signal f(t) is given by:

$$|F(\omega)|^2 = \begin{cases} \frac{\sigma_o^2(E) - G_n(\omega)}{G_c(\omega)}, & \omega \in \Omega_+(B_1) \\ 0, & \omega \in \Omega_o \end{cases}$$

wherein
$B_1$ is the desired bandwidth of the transmit signal f(t),
$G_c(\omega)$ is the first interference spectrum,
$G_n(\omega)$ is a noise spectrum,
$\Omega_o$ is complementary region in the frequency to $\Omega_+(B_1)$ and $\Omega_+(B_1)$ represents a frequency region where the following inequality is satisfied:

$$\omega \in \Omega_+(B_1) : G_n(\omega) \le \max_{\omega \in B_o} G_n(\omega).$$

19. The apparatus of claim 18 further comprising
a receiver filter which is part of the receiver,
and wherein the receiver filter is configured to have a Fourier transform $H_{opt}(\omega)$ which is given by $$H_{opt}(\omega) = Q^*(\omega) F^*(\omega) e^{-j\omega t_o}$$

where $Q(\omega)$ is the target signal Fourier transform, wherein $t_o$ is a decision instant at which the target signal is to be detected.

20. An apparatus comprising
a transmitter; and
a receive,
wherein the transmitter is configured to output a transmit signal f(t) having a bandwidth $B_1$ and an energy E that exceeds a predetermined energy level $E_{min}$ given below,
wherein the transmitter is configured to output the transmit signal f(t) towards a target and towards interference,
wherein the target produces a target signal,
wherein the receiver is configured to receive a combination signal at an input of the receiver, wherein the combination signal includes noise and the transmit signal f(t) modified by interacting with the target and the interference,
wherein the receiver is configured to act on the combination signal to form a receiver output signal,
wherein the transmit signal f(t) is selected so that the total interference at the input of the receiver is whitened, and the receiver is configured so that the ratio of the receiver output signal to interference plus noise power is maximized while maintaining the bandwidth $B_1$ for the receiver output signal, and
wherein $$E_{min} = \left(\max_{\omega \in \Omega_+(B_1)} G_n(\omega)\right) \frac{1}{2\pi} \int_{\Omega_+(B_1)} \frac{1}{G_c(\omega)} d\omega - \frac{1}{2\pi} \int_{\Omega_+(B_1)} \frac{G_n(\omega)}{G_c(\omega)} d\omega,$$

and wherein the Fourier transform $F(\omega)$ of the transmit signal f(t) is given by $$|F(\omega)|^2 = \begin{cases} \frac{\sigma_o^2(E) - G_n(\omega)}{G_c(\omega)}, & \omega \in \Omega_+(B_1) \\ 0, & \omega \in \Omega_o \end{cases}$$

wherein $$\sigma_o^2(E) = \frac{E + \frac{1}{2\pi} \int_{\Omega_+(B_1)} \frac{G_n(\omega)}{G_c(\omega)} d\omega}{\frac{1}{2\pi} \int_{\Omega_+(B_1)} \frac{1}{G_c(\omega)} d\omega},$$

and wherein
$B_1$ is the desired bandwidth of the transmit signal f(t),
E is the prescribed energy of the transmit signal f(t),
$G_c(\omega)$ is the interference spectrum,
$G_n(\omega)$ is the noise spectrum, $\Omega_0$ is complementary region in the frequency to $\Omega_+(B_1)$ and $\Omega_+(B_1)$ represents the frequency region where the following inequality is satisfied: for $\omega \in \Omega_+(B_1)$ we have $$G_n(\omega) \le \max_{\omega \in B_1} G_n(\omega).$$

21. The apparatus of claim 20 wherein the interference and the noise are part of a space based radar scene.

22. The apparatus of claim 20 wherein the interference and the noise are part of an airborne based radar scene.

23. The apparatus of claim 20 wherein the interference and the noise are part of a ground based radar scene.

24. The apparatus of claim 20 wherein the interference and the noise are part of an underwater sonar scene.

25. The apparatus of claim 20 wherein the transmit signal f(t), the target, the interference, and the noise are part of a cellular communication scene wherein the transmit signal f(t) represents a modulated signal, the target represents the channel, and the interference represents all interference signals.

26. An apparatus comprising
a transmitter;
and a receiver,
wherein the transmitter is configured to output a first transmit signal f(t) towards a target,
wherein the first transmit signal f(t) causes a total interference at an input of the receiver to be whitened;
wherein the target produces a first target signal when the first transmit signal interacts with the target,
wherein the first transmit signal f(t) has a first transmit signal bandwidth, first transmit signal energy, and a first transmit signal waveform,
wherein the receiver is configured to receive a first combination signal at the input of the receiver, wherein the first combination signal includes first noise signal, a first interference signal, and a first return signal which is the first transmit signal f(t) returned back from the target disregarding any effects of noise or interference,
wherein the receiver is configured to act on the first combination signal to form a first receiver output signal,
wherein the first receiver output signal has a first receiver output signal waveform,
wherein the first transmit signal has a first performance level which is a ratio of the first receiver output signal to the first interference signal plus the first noise signal,
wherein the transmitter is configured to output a second transmit signal f(t) towards the target,
wherein the second transmit signal has a second transmit signal bandwidth, a second transmit signal energy, and a second transmit signal waveform,
wherein the receiver is configured to receive a second combination signal at the receiver, wherein the second combination signal includes a second noise signal, a second interference signal, and a second return signal which is the second transmit signal returned back from the target disregarding any effects of noise or interference,
wherein the receiver is configured to act on the second combination signal to form a second receiver output signal,
wherein the second receiver output signal has a second receiver output signal waveform, wherein the second transmit signal bandwidth and the first transmit signal bandwidth are different,
wherein the second transmit signal energy and the first transmit signal energy are different,
wherein if the second transmit signal bandwidth is higher than the first transmit signal bandwidth, then the second transmit signal energy will be lower than the first transmit signal energy,
wherein if the second transmit signal bandwidth is lower than the first transmit signal bandwidth, then the second transmit signal energy will be higher than the first transmit signal energy,
wherein the second transmit signal has a second performance level which is a ratio of the second receiver output signal to the second interference signal plus the second noise signal, and wherein the first performance level is substantially the same as second performance level.

27. The apparatus of claim 26 further comprising
wherein the transmitter is configured so that an initial desired first bandwidth $B_1$ for the first transmit signal bandwidth is selected and a minimum required energy $E_1$ for the first transmit signal energy is selected according to $$E_1 = \frac{1}{2\pi} \int_{\Omega_+(B_1)} (\sigma_o^2(E_1) - G_n(\omega)) \frac{1}{G_c(\omega)} d\omega$$

wherein $$\sigma_o^2(E_1) = \max_{\omega \in B_1} G_n(\omega),$$

and determining the first performance level for an energy-bandwidth pair $(E_1, B_1)$ given by $$SINR(B_1) = \frac{1}{2\pi} \int_{\Omega_+(B_1)} \left(1 - \frac{G_n(\omega)}{\sigma_o^2(E_1)}\right) \frac{|Q(\omega)|^2}{G_c(\omega)} d\omega,$$

wherein
$Q(\omega)$ is a Fourier transform of the first target signal,
$G_c(\omega)$ is a spectrum for the first interference signal,
$G_n(\omega)$ is a spectrum for the noise signal, and
$\Omega_+(B_1)$ represents a frequency region where the following inequality is satisfied: for $\omega \in \Omega_+(B_1)$ we have $$G_n(\omega) \le \max_{\omega \in B_1} G_n(\omega).$$

28. The apparatus of claim 26 further comprising
configuring the transmitter so that the second transmit signal bandwidth $B_2$ is selected, which is larger than the first transmit signal bandwidth $B_1$ so as to satisfy the condition $$SINR(B_2) \le \frac{1}{2\pi} \int_{\Omega_+(B_1)} \frac{|Q(\omega)|^2}{G_c(\omega)} d\omega,$$

and for which the corresponding minimum energy for the second transmit signal energy $E_2$ and the second performance level $SINR_1(B_2)$ are determined as follows $$E_2 = \frac{1}{2\pi}\int_{\Omega_+(B_2)}(\sigma_o^2(E_2) - G_n(\omega))\frac{1}{G_c(\omega)}d\omega$$

and $$SINR(B_2) = \frac{1}{2\pi}\int_{\Omega_+(B_2)}\left(1 - \frac{G_n(\omega)}{\sigma_o^2(E_2)}\right)\frac{|Q(\omega)|^2}{G_c(\omega)}d\omega,$$

where $\sigma_o^2(E_2) = \max_{\omega \in B_2} G_n(\omega)$, and $106_+(B_2)$ represents a frequency region where the following inequality is satisfied: for $\omega \in \Omega_+(B_1)$ we have $$G_n(\omega) \leq \max_{\omega \in B_2} G_n(\omega);$$

and wherein the transmitter is configured so that a third transmit signal is output by the transmitter, wherein the third transmit signal has an energy level $E_3$ that satisfies the identity $$SINR(E_3, B_1) = a_1 - \frac{c_1}{E_3 + b_1} = SINR(B_2),$$

where $$a_1 = \frac{1}{2\pi}\int_{\Omega_+(B_1)}\frac{|Q(\omega)|^2}{G_c(\omega)}d\omega,$$

$$b_1 = \frac{1}{2\pi}\int_{\Omega_+(B_1)}\frac{G_n(\omega)}{G_c(\omega)}d\omega,$$

and $$c_1 = \frac{1}{2\pi}\int_{\Omega_+(B_1)}\frac{G_n(\omega)|Q(\omega)|^2}{G_c(\omega)}d\omega \cdot \frac{1}{2\pi}\int_{\Omega_+(B_1)}\frac{1}{G_c(\omega)}d\omega.$$

29. The apparatus of claim 28 further comprising
wherein the first transmit signal bandwidth which is $B_1$,
wherein the first transmit signal energy is $E_1$,
wherein the third transmit signal bandwidth is $B_2$,
wherein the third transmit signal energy is $E_3$,
wherein the first transmit signal has a Fourier transform given by $$|F(\omega)|^2 = \begin{cases} \left(\left(\max_{\omega \in B_2} G_n(\omega)\right) - G_n(\omega)\right) & \omega \in \Omega_+(B_2) \\ 0, & \text{otherwise} \end{cases};$$

wherein the third transmit signal has a Fourier transform given by $$|F(\omega)|^2 = \begin{cases} \dfrac{\sigma_o^2(E_3) - G_n(\omega)}{G_c(\omega)}, & \omega \in \Omega_+(B_1) \\ 0, & \omega \in \Omega_0 \end{cases}$$ wherein $$\sigma_o^2(E_3) = \frac{E_3 + \frac{1}{2\pi}\int_{\Omega_+(B_1)}\frac{G_n(\omega)}{G_c(\omega)}d\omega}{\frac{1}{2\pi}\int_{\Omega_+(B_1)}\frac{1}{G_c(\omega)}d\omega},$$

and wherein the first and third transmit signals have the same performance level $SINR(B_2)$ in terms of target detection in interference and noise, when used in conjunction with the receiver, wherein the receiver has a receiver filter which has a Fourier transform $H_{opt}(\omega)$ given by $$H_{opt}(\omega) = Q^*(\omega)F^*(\omega)e^{-j\omega t_o}$$

wherein $t_o$ is a decision instant at which the first target signal is to be detected.

30. The apparatus of claim 26 wherein
the first transmit signal f(t), the target, the first interference signal, and the first noise signal are part of a cellular communication scene where the first transmit signal f(t) represents a modulated signal, the target represents a channel, and the first interference signal represents all interference signals in the first combination signal.

31. The apparatus of claim 26 wherein
the first interference signal and the first noise signal are part of a space based radar scene.

32. The apparatus of claim 26 wherein
the first interference signal and the first noise signal are part of an airborne based radar scene.

33. The apparatus of claim 26 wherein
the first interference signal and the first noise signal are part of a ground based radar scene.

34. The apparatus of claim 26 wherein
the first interference signal and the first noise signal are part of an underwater sonar scene.

* * * * *